United States Patent
Feinberg

(10) Patent No.: US 6,756,443 B2
(45) Date of Patent: Jun. 29, 2004

(54) IONOMER/POLYAMIDE BLENDS WITH IMPROVED FLOW AND IMPACT PROPERTIES

(75) Inventor: Stewart Carl Feinberg, Exton, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/057,145

(22) Filed: Jan. 25, 2002

(65) Prior Publication Data

US 2003/0149175 A1 Aug. 7, 2003

(51) Int. Cl.⁷ .......................... C08L 77/00; C08L 51/00; C08L 23/00
(52) U.S. Cl. .......................... 525/66; 525/191; 525/193; 525/195; 525/201; 525/240; 525/221; 525/419
(58) Field of Search .......................... 525/66, 191, 193, 525/195, 201, 240, 221, 419

(56) References Cited

U.S. PATENT DOCUMENTS

| | | |
|---|---|---|
| 3,264,272 A | 8/1966 | Rees |
| 3,658,752 A | 4/1972 | Das et al. |
| 3,758,643 A | 9/1973 | Fischer |
| 4,078,020 A | 3/1978 | Rose et al. |
| 4,351,931 A | 9/1982 | Armitage |
| 4,992,486 A | 2/1991 | Feinberg |
| 5,028,674 A | 7/1991 | Hatch et al. |
| 5,089,332 A | 2/1992 | Feinberg |
| 5,091,478 A | 2/1992 | Saltman |
| 5,118,746 A | 6/1992 | Feinberg |
| 5,160,788 A | 11/1992 | Feinberg |
| 5,599,877 A * | 2/1997 | Wang et al. ................. 525/146 |
| 5,643,999 A | 7/1997 | Lee et al. |
| 5,721,314 A | 2/1998 | Hausmann |
| 5,840,453 A * | 11/1998 | Swidler ....................... 430/42 |
| 5,866,658 A | 2/1999 | Talkowski |
| 6,207,761 B1 | 3/2001 | Smith et al. |
| 2002/0004555 A1 | 1/2002 | Di-Benedetto et al. |

FOREIGN PATENT DOCUMENTS

EP 0072480 A2 2/1983

OTHER PUBLICATIONS

PCT International Search Report for International application No. PCT/US03/01791 dated Jul. 4, 2003.

* cited by examiner

Primary Examiner—Jeffrey Mullis

(57) ABSTRACT

An ionomer/polyamide blend with improved flow (e.g., lower viscosity) can be achieved while simultaneously maintaining or improving physical properties such as low temperature Izod impact resistance by the addition of low molecular weight ethylene/acrylic acid copolymer (e.g., so-called acid wax polymer derived from copolymerizing at least 5 weight percent and preferably greater than 9 weight percent acrylic acid and/or methacrylic acid with ethylene and having a melt index, ASTM D1238, preferably greater than 900 dg/min and most preferably greater than 5,000 dg/min). Optionally, the blends can further contain additives such as very low density polyethylene (VLDPE), ethylene propylene elastomer (EPR), ethylene propylene diene monomer elastomer (EPDM), corresponding maleic anhydride grafted elastomers (MAN-g-VLDPE; MAN-g-EPR; and MAN-g-EPDM), or mixtures thereof. The blends exhibiting improved flow characteristics according to the instant invention are particularly useful in the manufacture of automotive parts, panels and the like having a "class A" surface.

10 Claims, No Drawings

IONOMER/POLYAMIDE BLENDS WITH IMPROVED FLOW AND IMPACT PROPERTIES

BACKGROUND OF THE INVENTION

1. Field of the Invention

The present invention relates to ionomer/polyamide blends with improved flow and impact characteristics and a method of achieving the same. More specifically but not by way of limitation, the present invention relates to the addition of low molecular weight ethylene/acrylic (methacrylic) acid copolymer, very low density polyethylene (VLDPE), ethylene propylene elastomer (EPR), maleic anhydride grafted ethylene propylene elastomer (MAN-g-EPR), maleic anhydride grafted very low density polyethylene (MAN-g-VLDPE) or mixtures thereof to an ionomer/polyamide blend in order to reduce viscosity of such blend and simultaneously maintain or improve low temperature Izod impact.

2. Description of the Related Art

It is generally known in the art to employ a thermoplastic alloy based on a blend of ionomer and high density polyethylene or polyamide for injection molding exterior automotive molded-in-color fascia, bumper covers, side moldings and other decorative trim. These types of polymer blends are disclosed, for example, in U.S. Pat. No. 5,866,658 and are commercially available under the tradename Bexloy® from E. I. du Pont de Nemours and Company. They involve a copolymer of an α-olefin, typically ethylene, copolymerized with an α,β-ethenically unsaturated carboxylic acid, typically acrylic acid, methacrylic acid or mixtures thereof, wherein the acid copolymer has preferably from 65 to 100 percent of the acid groups neutralized with metal ions such as zinc, sodium or the like. Such ionomers are commercially available under the tradename Surlyn® from E. I. du Pont de Nemours and Company. In the '658 patent, the highly neutralized acid copolymer is blended with preferably one or more semicrystalline polyamides such as polycaproamide (nylon 6) and polyhexamethylene adipamide (nylon 6,6). One difficulty with such blends is the achieving and sustaining of optimum rheology without significantly compromising physical properties such as impact resistance and tensile strength.

BRIEF SUMMARY OF THE INVENTION

In view of the above mentioned problem, it has now been discovered that the addition or incorporation of a low molecular weight copolymer of ethylene copolymerized with acrylic acid, methacrylic acid and mixtures thereof optionally in combination with one or more additive such as very low density polyethylene (VLDPE), maleic anhydride grafted VLDPE, ethylene propylene diene monomer (EPDM) rubber, maleic anhydride grafted EPDM, and mixtures thereof improves the flow properties of the resulting ionomer/polyamide blend without significantly degrading physical properties such as impact resistance and tensile strength.

Thus, the present invention provides an ionomer/polyamide blend having improved flow properties comprising for every one hundred parts by weight of ionomer/polyamide blend:

(i) from one to twenty parts by weight low molecular weight copolymer of ethylene and at least one other comonomer selected from the group consisting of acrylic acid, methacrylic acid and mixtures there of, wherein the low molecular weight copolymer has a melt index (ASTM D1238) of greater than 350 dg/min and an acrylic acid and methacrylic acid combined comonomer content of at least 5 weight percent; and optionally (ii) up to twenty parts per weight of one or more additives selected from the group consisting of very low density polyethylene (VLDPE), maleic anhydride grafted VLDPE, ethylene propylene (EPR) rubber, ethylene propylene diene monomer (EPDM) rubber, maleic anhydride grafted EPR, maleic anhydride grafted EPDM, and mixtures thereof.

The present invention further provides a method of reducing the viscosity of an ionomer/polyamide blend without significantly degrading impact resistance and tensile strength comprising the steps of blending for every one hundred parts by weight of ionomer/polyamide blend (i) from one to twenty parts by weight low molecular weight copolymer of ethylene and at least one other comonomer selected from the group consisting of acrylic acid, methacrylic acid and mixtures thereof, wherein the low molecular weight copolymer has a melt index (ASTM D1238) of greater than 350 dg/min and an acrylic acid and methacrylic acid combined comonomer content of at least 5 weight percent; and optionally (ii) up to twenty parts per weight of one or more additives selected from the group consisting of very low density polyethylene (VLDPE), maleic anhydride grafted VLDPE, ethylene propylene (EPR) rubber, ethylene propylene diene monomer (EPDM) rubber, maleic anhydride grafted EPR, maleic anhydride grafted EPDM, and mixtures thereof.

The low molecular weight copolymer has a melt index as low as 350 but preferably a melt index of at least 900 dg/min and an acrylic acid and methacrylic acid combined comonomer content of at least 5 weight percent and preferably 9 weight percent or greater.

DETAILED DESCRIPTION OF THE INVENTION

For purposes of this invention the term "copolymer", unless otherwise specified, refers to a polymer derived from the polymerization of two or more different monomers that are alternative reactants during the polymerization. As such, the term is intended to include both "terpolymer" as well as polymers produced from more than three comonomers yet also includes "bipolymer". But when this term is used in reference to polyamides it is not intended to include for example a polyamide derived from a single dicarboxylic acid and one diamine. Also, the phrase "consisting essentially of" means that the recited components are essential, while smaller amounts of other components may be present to the extent that they do not detract from the operability of the present invention. In contrast, the term "comprising" is intended to acknowledge that significant amount of other components may be present provide that some of the benefit and/or advantages of the instant invention are still being realized (e.g., improved flow or flow characteristics, and the like).

The ionomer/polyamide blends useful according to the instant invention broadly includes any such thermoplastic alloy based on combining or mixing a neutralized or partially neutralized ethylene/α,β-unsaturated carboxylic acid copolymer (herein referred to as acid copolymer) with a thermoplastic polyamide polymer. Such blends may and frequently are reinforced with various fibers and other reinforcing fillers. In particular, the invention relates to ionomer/polyamide blends of highly neutralized copolymers of ethylene and high weight percentages of $\alpha,\beta$-ethylenically-unsaturated $C_3$ to $C_8$ carboxylic acids dispersed in semicrystalline polyamides such as nylon-6. These blends are particularly useful in applications such as molded parts where a combination of toughness, high gloss, abrasion/scratch (mar) resistance, UV resistance, high temperature properties and stiffness are desired. Particularly preferred types of these ionomer/polyamide blends are disclosed, for example, in U.S. Pat. No. 5,866,658, incorporated herein by reference. As taught in this reference, the blend preferably involves 60 to 40 (more preferably 50 to 45, also 60 to 55) weight percent ionomer and 40 to 60 (more preferably 50 to 55, also 40 to 45) weight percent polyamide (percentages being based on total ionomer and polyamide) wherein the polyamide forms a continuous (or co-continuous) phase. The ionomer, preferably present in a higher volume percent than the polyamide, is dispersed in the continuous or co-continuous polyamide phase. The ionomer is dispersed in a uniform manner as small, essentially spherical particles for the most part with average diameter of about 0.1 to about 0.2 μm or as oblong and curvilinear or ellipsoid shaped particles with an average cross-sectional diameter (minor axis length) of about 0.1 to about 0.2 μm in a continuous polyamide phase as can be seen in Figures of the '658 patent.

The blend may also contain components such as ultraviolet (UV) light stabilizers, antioxidants and thermal stabilizers, pigments and dyes, fillers, anti-slip agents, plasticizers, nucleating agents, other processing aids, and the like for both polyamide and ionomer. Preferably, these components are present in amounts of about 1 to about 3 (preferably about 1.5 to about 3) parts per hundred parts by weight of the ionomer/polyamide blend, but may be present in lower or higher levels.

The ionomers suitable for this invention are formed from copolymers of ethylene and high weight percentages of $\alpha,\beta$-ethylenically-unsaturated $C_3$ to $C_8$ carboxylic acids, preferably methacrylic or acrylic acid. The percentage of acid that is considered as being "high" depends on the acid employed. In the case of methacrylic acid, it preferably is 15 to 25 weight percent based on total weight of the copolymer. The lower preference for acrylic acid is 14 weight percent as a result of molecular weight differences. In the final blend, the acid moieties in the copolymer are highly neutralized (preferably 65 to 100 percent) with metal cations, particularly cations compatible with polyamide, preferably zinc.

Typically the ionomers of the present invention are derived from direct copolymers of ethylene and $\alpha,\beta$-ethylenically-unsaturated $C_3$–$C_8$ carboxylic acid ("ethylene-acid copolymers") by neutralization with metal ions. By "direct copolymer", it is meant that the copolymer is made by polymerization of monomers together at the same time, as distinct from a "graft copolymer" where a monomer is attached or polymerized onto an existing polymer chain. Methods of preparing such ionomers are well known and are described in U.S. Pat. No. 3,264,272 which is herein incorporated by reference. Preparation of the direct ethylene-acid copolymers on which the ionomers are based is described in U.S. Pat. No. 4,351,931 which is also incorporated by reference herein. Ethylene-acid copolymers with high levels of acid are difficult to prepare in continuous polymerizers because of monomer-polymer phase separation. This difficulty can be avoided however by use of "cosolvent technology" as described in U.S. Pat. No. 5,028,674 which is also incorporated herein by reference or by employing somewhat higher pressures than those at which copolymers with lower acid can be prepared.

The ethylene-acid copolymers used to make the ionomeric copolymer of this invention can be E/X/Y copolymers where E is ethylene; X is a softening comonomer and Y is the $\alpha,\beta$-ethylenically-unsaturated $C_3$ to $C_8$ carboxylic acid, particularly acrylic or methacrylic acid. Preferably, however, the ethylene-acid copolymer is a dipolymer (no softening comonomer). The preferred acid moieties are methacrylic acid and acrylic acid.

By "softening", it is meant that the polymer is made less crystalline. Suitable "softening" comonomers (X) are monomers selected from alkyl acrylate, and alkyl methacrylate, wherein the alkyl groups have from 1–12 carbon atoms which, when present, may be up to 30 (preferably up to 25, most preferably up to 15) weight percent of the ethylene-acid copolymer.

Preferred ethylene-acid dipolymers are ethylene/acrylic acid and ethylene/methacrylic acid. Specific other copolymers include ethylene/n-butyl acrylate/acrylic acid, ethylene/n-butyl acrylate/methacrylic acid, ethylene/iso-butyl acrylate/methacrylic acid, ethylene/iso-butyl acrylate/acrylic acid, ethylene/n-butyl methacrylate/methacrylic acid, ethylene/methyl methacrylate/acrylic acid, ethylene/methyl acrylate/acrylic acid, ethylene/methyl acrylate/methacrylic acid, ethylene/methyl methacrylate/methacrylic acid, and ethylene/n-butyl methacrylate/acrylic acid.

The ethylene-acid copolymers used to make the ionomeric copolymers of this invention have the acid moiety present in a high amount. The amount that will be considered as "high" will depend on which acid moiety is employed, particularly the molecular weight of the acid moiety. In the case of ethylene/methacrylic acid, the preferred acid level is 15 to 25, (preferably 18 to 25, more preferably 19 to 22) weight percent of the copolymer. In the case of ethylene/acrylic acid, the preferred acid level is 14 to 25, (preferably 16 to 25, more preferably 18 to 22) weight percent of the copolymer. Particularly in view of the disclosures herein, one skilled in the art will be able to determine the "high" acid levels for other acid moieties that are needed to get the desired gloss levels and abrasion resistance.

It will be recognized that it is possible to blend more than one copolymer, the acid level of any one or more being outside the "high" range of the invention, to obtain an average acid level prior to neutralization that is within the preferred high percentage acid levels. Preferably, in the case of blends, the weight percent acid in each acid copolymer from which the ionomer components are derived should be close to the preferred range, and most preferably they should be within this range.

The acid moiety is preferably highly neutralized metal cations, particularly monovalent and/or bivalent metal cations. It is preferable to neutralize with metal cations that are compatible with the nylon, that is, with cations that also interact with the amide links of the polyamide. Preferred metal cations include lithium, magnesium, calcium, and zinc, or a combination of such cations. Zinc is most preferred. Potassium and sodium are poor choices. Potassium-neutralized ethylene/acid copolymers tend to absorb water adversely effecting the nylon. Sodium ionomers are difficult to stabilize to UV radiation. Magnesium and calcium preferably are used in combination with zinc.

While the neutralizing agent (e.g., zinc oxide, magnesium oxide, and calcium oxide) can be added in solid form, it preferably is added as a concentrate in an ethylene-acid copolymer carrier. This concentrate is made by carefully selecting the ethylene-acid copolymer and the blending conditions to assure that the neutralizing agent does not significantly neutralize the carrier. This neutralizing concentrate can also contain small amounts (up to about 2 weight percent) of one or more salts of the metal cations (e.g. acetates and stearates).

To achieve the desired morphology (ionomer dispersed in continuous or co-continuous nylon phase), the ionomer is neutralized to a high enough level to attain a viscosity greater than that of the nylon. It is preferred to first blend a partially neutralized, lower viscosity ethylene-acid copolymer into the nylon and then to further neutralize to raise the ionomer viscosity while melt blending under intense mixing conditions.

As will be appreciated by one skilled in the art based on the teachings herein, the preferred level of neutralization will depend on the ethylene-acid copolymers employed and the properties desired. The level of acid and the degree of neutralization can be adjusted to achieve the particular properties desired. Raising the average acid level enhances gloss. High neutralization yields harder, glossier products while more moderate neutralization yields tougher products.

In principle any polyamide can be used in the blend according to the instant invention and derive benefit from the presence of the flow improving additives. Preferably a semicrystalline polyamide, again consistent with the '658 patent, is to be used in the present invention. The term "semicrystalline polyamide" is well known to those skilled in the art. Semicrystalline polyamides suitable for this invention are generally prepared from lactams or amino acids or from condensation of diamines such as hexamethylene diamine with dibasic acids such as sebacic acid. Copolymers and terpolymers of these polyamides are also included. Preferred semicrystalline polyamides are polycaproamide (nylon 6), polyhexamethylene adipamide (nylon 6,6), most preferably nylon 6. Other semicrystalline polyamides useful in the present invention include nylon 11; nylon 12; nylon 12,12; and copolymers and terpolymers such as nylon 6/6,6; nylon 6/6,10; nylon 6/12; nylon 6,6/12; nylon 6/6,6/6,10 and nylon-6/6T.

Amorphous polyamides can be substituted for some of the semicrystalline polyamide to raise the glass transition temperature (Tg) of the nylon phase. Up to about 10 weight percent, preferably up to about 5 weight percent, of the polyamide phase can be amorphous polyamides. The term "amorphous polyamide" is well known to those skilled in the art. "Amorphous polyamide," as used herein, refers to those polyamides which are lacking in crystallinity as shown by the lack of an endotherm crystalline melting peak in a Differential Scanning Calorimeter ("DSC") measurement (ASTM D-3417), 10° C./minute heating rate.

Examples of the amorphous polyamides that can be used include hexamethylenediamine isophthalamide, hexamethylenediamine isophthalamide/terephthalamide terpolymer, having iso/-terephthalic moiety ratios of 100/0 to 60/40, mixtures of 2,2,4- and 2,4,4-trimethylhexamethylenediamine terephthalamide, copolymers of hexamethylene diamine and 2-methylpentamethylenediame with iso-or terephthalic acids, or mixtures of these acids. Polyamides based on hexamethylenediamine iso/terephthalamide containing high levels of terephthalic acid moiety may also be useful provided a second diamine such as 2-methyldiaminopentane is incorporated to produce a processible amorphous polymer.

Amorphous polyamides may contain, as comonomers, minor amounts of lactam species such as caprolactam or lauryl lactam, even though polymers based on these monomers alone are not amorphous as long as they do not impart crystallinity to the polyamide. In addition, up to about 10 weight percent of a liquid or solid plasticizer such as glycerol, sorbitol, mannitol, or aromatic sulfonamide compounds may be included with the amorphous polyamide.

The amorphous polyamide may be a blend of ethylene vinyl alcohol and amorphous nylon in which the polyamide component comprises about 5 to about 95 weight percent of the total composition of EVOH plus polyamide, preferably about 15 to about 70 weight percent, and most preferably about 15 to about 30 weight percent.

The polyamide component should preferably have a viscosity under melt-blend conditions that is high enough to provide the mechanical properties but low enough to create the desired phase relationship for the ionomer/polyamide blend. The viscosity of the polyamide should be higher than that of the ethylene-acid copolymer or ionomer at low neutralization levels, but should be less than the ionomer at high neutralization levels.

The low molecular weight ethylene/acrylic acid copolymer employed as a viscosity modifying polymer additive to the ionomer/polyamide blend is a high melt index (MI) copolymer of ethylene with an unsaturated carboxylic acid selected from the group consisting of acrylic acid (E/AA copolymer) and methacrylic acid (E/MAA copolymer), as described in U.S. Pat. No. 5,118,746; incorporated herein by reference. The viscosity-modifying polymer should have a melt index of at least 350 and preferably greater than 900 dg/min, more preferably at least about 5,000 dg/min, and most preferably at least 10,000 dg/min, determined according to ASTM 1238, condition E. The viscosity modifying copolymer should also contain cumulatively at least about 5 weight percent and preferably at least 9 weight percent carboxylic acid monomer. Also, preferably the ethylene/acrylic acid copolymer employed is selected such as to have a similar carboxylic acid comonomer content as that of the ionomer being employed. A minor amount of third comonomer may be present provided the appropriate MI level is retained. The third comonomer may be a copolymerizable monomer selected from the group consisting of $C_1$ to $C_{10}$ alkylesters of $C_3$ to $C_7$ α,β-unsaturated carboxylic acids, vinyl esters, vinyl ethers, acrylonitrile, methacrylonitrile, carbon monoxide, and sulfur dioxide.

Generally, the relative amount of the viscosity modifying copolymer employed is chosen according to the desired MI to be achieved. Mathematically, the log of the MI of the resulting viscosity modified ionomer/polyamide blend is linearly proportional to the weight percent ethylene/acrylic acid copolymer employed up to about twenty weight percent E/AA or E/MAA. However it should be appreciated for purposes of this invention that the benefits of the instant invention can be partially realized at viscosity modifying polymer-loading level greater than twenty weight percent and as such should be considered an equivalent for purpose of this invention. Even though at higher loading levels the physical properties of the resulting blends may start to degrade.

High melt index viscosity modifying copolymer as described above are commercially available from Honeywell Performance Polymers and Chemicals under the tradename AC® Copolymers (E/AA copolymers). Such copolymers also can be made according to the general disclosure of U.S. Pat. No. 3,264,272.

Optionally the ionomer/polyamide blend with viscosity modifying copolymer may contain one or more other additives such as very low density polyethylene (VLDPE), ethylene propylene elastomer/rubber (EPR), maleic anhydride grafted ethylene propylene elastomer/rubber (MAN-g-EPR), ethylene propylene diene monomer elastomer/rubber (EPDM), maleic anhydride grafted ethylene propylene diene monomer elastomer/rubber (MAN-g-EPDM), maleic anhydride grafted very low density polyethylene (MAN-g-VLDPE) or mixtures thereof. The very low density polyethylene (VLDPE) useful in the instant invention is essentially any such linear polyethylene generally known in the art having a density in the range of from about 0.89 to about 0.915. Such VLDPE is typically produced by copolymerization of predominantly ethylene and at least one $C_3$ to $C_8$ alpha-olefin comonomer. The maleic anhydride grafted very low density polyethylene (MAN-g-VLDPE) is a VLDPE to which up to a few weight percent of maleic anhydride has been grafted. Typically from one to two percent maleic anhydride based on the weight of VLDPE is sufficient. The ethylene propylene elastomer (EPR) useful in the instant invention is essentially any such elastomer again as generally known in the art. Preferably the EPR will be an EPDM elastomeric terpolymer of ethylene, propylene and a third comonomer non-conjugated diene. Such elastomers are disclosed in U.S. Pat. Nos. 3,658,752; 3,758,643; and 4,078,020, incorporated herein by reference. The MAN grafted EPR and/or EPDM are also typically derived from a grafting reaction involving one to two percent maleic anhydride. The actual grafting reaction for incorporating the maleic anhydride onto the additive can be performed essentially by any of the methods generally known in the art. For purposes of the present invention, it is contemplated that other unsaturated dicarboxylic acid such as fumaric, itaconic and mesaconic acids having structures closely related to and potentially precursors to a similar anhydride after the grafting reaction should be considered equivalent to the MAN in the MAN grafted additives. The optional additives can be employed up to about twenty weight percent of the total blend. However it should be appreciated for purposes of this invention that the benefits of the instant invention can be partially realized at additive-loading level greater than twenty weight percent and as such should be considered an equivalent for purposes of this invention. Even though at these higher loading levels the physical properties of the resulting blends may start to degrade.

In practice, the viscosity modified blends of the present invention will advantageously contain minor amounts, typically up to a few percent, of other additives such as pigments, coloring agents, carbon black, ultraviolet light (UV) stabilizers, antioxidants, processing aids, fiber glass, mineral fillers, anti-slip agents, plasticizers, nucleating agents, and the like. Various such additives and their respective use are well known in the art and commercially used in connection with ionomer/polyamide blend applications. Typical preferred combinations are specifically illustrated in the examples.

The preparation of the blends according to the instant invention can be performed using standard mixing practices, as generally known in the art. Preferably a commercial mixer such as a Banbury or commercial thermoplastic extruder, in particular a twin-screw extruder, or the like is used to achieve complete admixing of the components and to give a homogenous dispersion of the components. Alternatively the final homogenous dispersion can be achieved in the final injection molding of the article of manufacture starting from separate components, intermediates, component precursors, or some combination of the same. The blending can also be performed in stages depending on the choice and availability of staring components. As such, a commercially available ionomer/polyamide blend can be directly co-extruded with the ethylene/acrylic acid copolymer flow modifier and other additives such as very low density polyethylene (VLDPE), ethylene propylene elastomer (EPR), maleic anhydride grafted ethylene propylene elastomer (MAN-g-EPR), ethylene propylene diene monomer (EPDM) elastomer, maleic anhydride grafted ethylene propylene diene monomer elastomer (MAN-g-EPDM), maleic anhydride grafted very low density polyethylene (MAN-g-VLDPE) or mixtures thereof. Alternatively the ionomer, polyamide and ethylene/acrylic acid copolymer plus optional other additives can be simultaneously co-extruded to achieve the desired blend. It is further contemplated that the degree of neutralization of the ionomer can be intentionally elevated during the blending step by addition of metal hydroxide, metal oxide or the like. It is further contemplated that the copolymer of ethylene with an unsaturated carboxylic acid (i.e., the copolymer precursor of the ionomer) can be employed with a neutralizing metal component in the co-extrusion process, thus making the ionomer in situ during the blending.

At the high degree of neutralization, the viscosity of the ionomer will exceed that of the polyamide at processing conditions. As such, a single step process or "in situ neutralization" process is preferred. Processing can be greatly simplified if the ethylene-acid copolymer is partially neutralized but to a level less than that ultimately desired prior to melt-blending with the polyamide or, preferably, if ionomers such as the various Surlyn® ionomers, particularly ones with high acid levels, available from E. I. du Pont de Nemours and Company are employed as the starting ionomer which is further neutralized concurrently with or subsequent to blending with the polyamide to the desired percent neutralization. As illustrated in the following examples the process can be advantageously performed in a staged extruder with multiple feed ports wherein the partially neutralized ionomer, polyamide, the ethylene/acrylic acid copolymer flow modifier and other additives such as very low density polyethylene (VLDPE), ethylene propylene diene monomer elastomer (EPDM), maleic anhydride grafted ethylene propylene diene monomer elastomer (MAN-g-EPDM), maleic anhydride grafted very low density polyethylene (MAN-g-VLDPE) are intentionally added at different zones of the single extrusion mixing equipment.

To achieve the desired morphology, the ethylene-acid copolymer, preferably partially neutralized with a cation that is compatible with the nylon, and the polyamide should be melt blended under intensive mixing conditions (high shear) with further neutralization as the blending occurs. Mixing should be at an intensity, temperature and residence time sufficient to get the desired morphology. An efficient devolitilization system is needed to remove water that is formed during the neutralization process. Devolitization efficiency is more important if starting at low or no neutralization since more water will be formed. Preferably there should be at least one vacuum zone in the melt compounding with at least 630 mm Hg vacuum applied to remove moisture.

The various starting ingredients may first be combined with one another in what is commonly referred to as a "salt and pepper" blend. They may also be combined by simultaneous or separate metering or they may be divided and blended in one or more passes into one or more mixing sections of mixing equipment such as extruders, Banbury mixers, Buss Kneaders, Farrell continuous mixers or the like. If more than one extruder feed zone is available, the nylon, the neutralizing agent preferably as a concentrate, and some of the ionomer may be added at the rear most feed port with the remainder of the ionomer being added in a later feed zone. The polymer strands exiting the extruder are preferably quenched in a water bath prior to cutting into pellets. Alternate methods well recognized by one skilled in the art for pelletizing including underwater cutting and air quenching could be used.

The following examples are presented to more fully demonstrate and further illustrate various aspects and features of the present invention. As such, the showings are intended to further illustrate the differences and advantages of the present invention but are not meant to be unduly limiting. Except as otherwise indicated, mixing in each of the examples was in a five heating zone, 28 mm twin-screw extruder equipped with a Kenics Company static mixer between the tip of the extruder and a single hole die plate. The extruder in each case was operated at a screw speed of 200 revolutions per minute (rpm) with the vacuum port run at about 630 mm mercury vacuum with ingredients fed at a rate of about 10 pounds per hour to the respective split feed zones of the extruder. A nitrogen blanket was maintained on the feed hopper. The temperature profile across the length of the extruder was: throat, about 25° C.; Zone 1, 220° C.; Zones 2, 3, 4, and 5, 250° C.; Adapters 1 and 2, 250° C.; and Die, 265° C. Residence time for the samples was about 2.5 minutes. Samples were quenched in a water bath (about 23° C.) prior to cutting into pellets.

Test bars (5 inch by ½ inch by ⅛ inch), plaques (3 inch by 5 inch by ⅛ inch), and disks (3 inch by ⅛ inch) for physical testing were molded using a single screw injection molding machine. Except as otherwise indicated, the samples in each case were injection molded on a 6 ounce capacity injection molding machine using a general purpose screw with barrel temperature set to achieve melt temperatures in the 260° C. range. Molding conditions employed were fast ram forward speed, 60 rpm screw speed, 50 pounds per square inch gauge (psig) back pressure, 400–800 psig injection pressure, 20 second (sec.) injection time, 30 sec. hold time, and 5/32 inch nozzle.

Various test conditions for determining physical properties were employed. Melt Index (MI) was determined according to ASTM D1238, condition E, at a temperature of 190° C. and load of 2,160 grams. Melt Viscosity was determined at 240° C. using a capillary length of 30 mm and capillary diameter of 1 mm. Tensile properties were determined according to ASTM D1708 using (½ inch by ⅝ inch by ⅛ inch bars die-cut from plaques (3 inch by 5 inch by ⅛ inch). The measurements were made on an Instron operated at a cross-head speed of 2 inch/minute. Flexural modulus was measured on (5 inch by ½ inch by ⅛ inch) test bars using a 2 inch span, according to ASTM D790. Notched Izod impact was determined according to ASTM D256 using (2½ inch by ½ inch by ⅛ inch) bars having a 0.1 inch notch machined into the side of the bar. The bars were derived from a single 5 inch by ½ inch by ⅛ inch molded bar that is then cut into two halves (i.e., one near the gate end and the other is the far end).

The raw starting materials, their characterization and respect commercial source are summarized as follows:

AC540—95/5:E/AA copolymer wax, acid number (mg KOH/gm)=40, density=0.93 gm/cc, MI>15,000, Mettler drop point=105° C. (Honeywell).

AC5120—85/15:E/AA copolymer wax, acid number (mg KOH/gm)=120, density=0.94 gm/cc, MI>15,000, Mettler drop point=92° C. (Honeywell).

Chimassorb® 944 FD—Hindered amine light stabilizer (Ciba-Geigy Corp.).

Flexomer® DFDU1085=Ethylene/butene VLDPE,>15% butene, density=0.884–0.900, MI=3–4 (Union Carbide Corp.).

HPU=E/MAA copolymer; 19.0% MAA, 1714 M.I.

Irganox® 1010=Tetrakis(methylene(3,5-di-tert-butyl-4-hydroxycinnamate) (Ciba-Geigy Corp.).

Irganox® B1171=1:2/Irganox® 1010/Irgafos 168 blend. Irgafos 168=Tris(2,4-di-tert-butylphenyl)phosphate (Ciba-Geigy Corp.).

Nordel® 2722=Narrow Molecular weight distribution elastomer, 72/21/7: Ethylene/propylene/hexadiene terpolymer (DuPont).

Surlyn® 9120—81/19:E/MAA copolymer, 36% neutralized with zinc, base resin MI=60, ionomer MI=1.0.

Tinuvine® 779 DF=UV stabilizer (Ciba-Geigy Corp.).

TRX-101—Maleic anhydride-grafted Nordel® 2744; nominal 2.1% MAN; MI=1.5–5.

Ultramid® B3=nylon 6; RV=2.8 (BASF)

EXAMPLE 1

A series of seven different blends of polyamide and ionomer were prepared and tested as generally described above. In the each of the runs the blends involved an ionomer based on a copolymer of 81 weight percent ethylene copolymerized with 19 weight percent methacrylic acid wherein the degree of neutralization of carboxylic acid groups with zinc was typically between 68 and 71 percent (Surlyn® 9120, MI=1.1) and a polyamide based on nylon 6 (Ultramid® B3). Six of the seven runs involved one of two different low molecular weight ethylene copolymers as a flow additive; i.e., ethylene copolymerized with either 5 weight percent acrylic acid (AC540) or 15 weight percent acrylic acid (AC5120). Two of the runs had a maleic anhydride grafted EPDM rubber (TRX-101) additive in addition to the ethylene copolymer flow additive. One run had an additional EPDM rubber (Nordel® 2722) additive and one had a VLDPE (Flexomer DFDU1085) additional additive. The control was a corresponding polyamide/ionomer blend without the additives. Details of the compositions and resulting data are presented in TABLE 1. In each case the molten viscosity of the blend was increased by the addition of the ethylene/acrylic acid copolymer. As shown in the table, the ethylene/acrylic acid copolymer flow modifier did not significantly compromise the low temperature Izod impact relative to the control.

TABLE 1

| RUN | 1 | 2 | 3 | 4 | 5 | 6 | 7 |
| --- | --- | --- | --- | --- | --- | --- | --- |
| ULTRAMID ® B3 | 40.4% | 38.2% | 38.2% | 38.2% | 36.0% | 36.0% | 36.0% |
| SURLYN ® 9120 | 46.5% | 44.0% | 44.0% | 44.0% | 41.5% | 41.5% | 41.5% |
| AC540 (5% AA) | — | 5.0% | — | — | — | — | — |

TABLE 1-continued

| RUN | 1 | 2 | 3 | 4 | 5 | 6 | 7 |
|---|---|---|---|---|---|---|---|
| AC5120 (15% AA) | — | — | 5.0% | 2.5% | 5.0% | 5.0% | 5.0% |
| TRX-101 | — | — | — | 2.5% | — | — | — |
| NORDEL ® 2722 | — | — | — | — | 5.0% | 5.0% | — |
| Flexomer DFDU1085 | — | — | — | — | — | — | 5.0% |
| ZnO Conc. (CS8749-5) | 5.6% | 5.3% | 5.3% | 5.3% | 5.0% | 5.0% | 5.0% |
| Sodium Hypophosphite | 0.2% | 0.2% | 0.2% | 0.2% | 0.2% | 0.2% | 0.2% |
| Reed Black CNY61696 | 3.9% | 3.8% | 3.8% | 3.8% | 3.8% | 3.8% | 3.8% |
| TENSILE PROPERTIES @ Room Temperature | | | | | | | |
| Tensile @ Yield (psi) | 5,150 | 4,810 | 4,970 | 4,750 | 4,580 | 3,890 | 3,950 |
| El. @ Yield (%) | 20% | 21% | 23% | 21% | 21% | 7% | 7% |
| Max Tensile (psi) | 7,410 | 4,830 | 6,560 | 6,210 | 6,210 | 4,370 | 4,260 |
| Elong. @ Max Tens. (%) | 250% | 76 ± 75% | 230% | 220% | 240% | 36% | 34% |
| Tensile @ Brk (psi) | 7,410 | 4,480 | 6,560 | 6,210 | 6,210 | N/D | N/D |
| El. @ Brk (%) | 250% | 150% | 230% | 220% | 240% | 120% | 140% |
| FLEX MODULUS | 140,100 | 136,300 | 141,600 | 138,800 | 123,600 | 118,400 | 123,300 |
| NOTCHED IZOD IMPACT @ −30° C. | | | | | | | |
| Gate End | 3.62 | 2.82 | 5.10 | 6.19 | 5.60 | 4.76 | 5.65 |
| Far End | 4.62 | 3.75 | 5.27 | 6.17 | 5.52 | 5.03 | 5.33 |

EXAMPLE 2

To further illustrate the enhanced flow characteristics of the flow modified blends and method of producing such blends according to the present invention, ten additional index of the blend most effectively when added to both the up-stream ionomer and the down stream polyamide. The low temperature notched Izod impact is slightly degraded with increasing levels of AC5120 but room temperature Izod impact is essentially unaffected.

TABLE 2

| * | Run | 1 | 2 | 3 | 4 | 5 | 6 | 7 | 8 | 9 | 10 |
|---|---|---|---|---|---|---|---|---|---|---|---|
| Added Up-Stream | Surlyn ® 9120 | 41.8% | 36.6% | 37.9% | 39.2% | 29.8% | 32.8% | 35.8% | 29.8% | 32.8% | 35.8% |
| | AC5120(15% AA) | — | — | — | — | 6.0% | 4.5% | 3.0% | 12.0% | 9.0% | 6.0% |
| | ZnO Conc. (CS8749-5) | 2.3% | 2.0% | 2.0% | 2.1% | 2.3% | 2.3% | 2.3% | 2.3% | 2.3% | 2.3% |
| Added Down-Stream | ULTRAMID ® B3 | 52.3% | 45.8% | 47.4% | 49.0% | 52.3% | 52.3 | 52.3% | 52.3% | 52.3% | 52.3% |
| | AC5120(15% AA) | — | 12.0% | 9.0% | 6.0% | 6.0% | 4.5% | 3.0% | — | — | — |
| | Zn Stearate | 1.5% | 1.5% | 1.5% | 1.5% | 1.5% | 1.5% | 1.5% | 1.5% | 1.5% | 1.5% |
| | Sodium Hypophosphite | 0.2% | 0.2% | 0.2% | 0.2% | 0.2% | 0.2% | 0.2% | 0.2% | 0.2% | 0.2% |
| | Approx. Vol % Nylon | 51.3% | 44.1% | 45.9% | 47.7% | 51.2% | 51.2% | 51.2% | 51.2% | 51.2% | 51.2% |
| | Approx. Vol % SURLYN ® | 48.7% | 42.0% | 43.6% | 45.3% | 34.7% | 38.2% | 41.7% | 34.7% | 38.2% | 41.7% |
| | Nylon/SURLYN ® Vol % Ratio | 1.05 | 1.05 | 1.05 | 1.05 | 1.48 | 1.34 | 1.23 | 1.48 | 1.34 | 1.23 |
| | PHASE INVERSION (J/g) | | | | | | | | | | |
| | Extrusion Rate (lb/hr) | 20.1 | 24.9 | 24.9 | 24.9 | 25.2 | 24.9 | 24.9 | 24.6 | 24.9 | 25.2 |
| | PELLET (J/gm) | 24.8 | — | — | — | 18.8 | 23.7 | 21.9 | — | — | 20.6 |
| | MELT INDEX (240° C./2.16 kg) | 2.2 | 6.0 | 4.6 | 2.6 | 6.9 | 4.9 | 4.0 | 3.4 | 5.6 | 5.4 |
| | NOTCHED IZOD IMPACT @ 30° C. - NATURAL COLOR | | | | | | | | | | |
| | Gate End | 4.36 | | | | 1.74 | 1.92 | 2.06 | | | 2.03 |
| | Far End | 4.90 | | | | 1.69 | 1.87 | 2.36 | | | 2.15 |
| | NOTCHED IZOD IMPACT @ ROOM TEMP. NATURAL | | | | | | | | | | |
| | Gate End | 27.8 | | | | 27.7 | 28.3 | 28.2 | | | 27.9 |
| | Far End | 27.3 | | | | 25.4 | 25.6 | 26.2 | | | 25.8 | runs involving blends of polyamide (Ultramid® B3) and ionomer (Surlyn® 9120) were prepared and tested. A split feed extruder was employed with the Surlyn® 9120 being introduced up-stream and the polyamide being introduced down stream. The flow modifying additive (AC5120, 15% AA) was introduced at three different concentration levels (12, 9 ands 6 weight percent) and three combinations of locations (i.e., all up-stream, all down-stream, and both up-stream and down-stream). The resulting data are presented in TABLE 2. As can be seen from his data, increasing AC-resin level reduces molten viscosity and increases melt

EXAMPLE 3

In a manner analogous to example 2, an additional set of runs involving blends of the polyamide (Ultramid® B3) and ionomer (Surlyn® 9120) were prepared by the split feed procedure and tested. The respective blends were modified by the addition of either ethylene/acrylic acid copolymer (AC5120, 15% AA) or ethylene/methacrylic acid copolymer of approximately the same acid comonomer content (HPU E/MAA; 19.0% MAA). The resulting data are presented in TABLE 3. This data illustrates the improvement in flow for either ethylene/methacrylic acid copolymer or ethylene/ acrylic acid copolymer being added to an ionomer/polyamide blend with a lightly better impact for E/MAA vs. E/AA.

with 2.1% maleic anhydride (TRX-301). The resulting data are presented in TABLE 4. This data illustrates the progressive lowering of the Izod Impact strength at 24° C. and 0°

TABLE 3

| | Run | 1 | 2 | 3 | 4 | 5 | 6 |
|---|---|---|---|---|---|---|---|
| ADDED UP-STREAM | SURLYN ® 9120 | 41.80% | 32.79% | 32.79% | 33.95% | 33.95% | 29.88% |
| | AC5120 (15% AA) | — | 4.50% | — | 3.00% | — | — |
| | HPU E/MAA | — | — | 4.50% | — | 3.00% | 6.38% |
| | ZnO Conc. (CS8749-5) | 2.25% | 2.25% | 2.25% | 2.25% | 2.25% | 2.39% |
| | CHIMASSORB ® 944 FD | 0.94% | 0.94% | 0.94% | 0.94% | 0.94% | 1.00% |
| | TINUVIN ® 234 | 0.47% | 0.47% | 0.47% | 0.47% | 0.47% | 0.50% |
| | IRGANOX ® 1010 | 0.20% | 0.20% | 0.20% | 0.20% | 0.20% | 0.21% |
| | IRGANOX ® B1171 | 0.37% | 0.37% | 0.37% | 0.37% | 0.37% | 0.39% |
| ADDED DOWN-STREAM | ULTRAMID ® B3 | 52.30% | 52.30% | 52.30% | 54.14% | 54.14% | 51.06% |
| | AC5120 (15% AA) | — | 4.50% | — | 3.00% | — | — |
| | HPU E/MAA 123-A6:30 (19.0% MAA, 1714 MI) | — | — | 4.50% | — | 3.00% | 6.38% |
| | Zn Stearate | 1.50% | 1.50% | 1.50% | 1.50% | 1.50% | 1.60% |
| | Sodium Hypophosphite | 0.170% | 0.180% | 0.180% | 0.180% | 0.180% | 0.19% |
| | FLEX MOD (psi) | 114,700 | 117,400 | 126,100 | 118,200 | 122,500 | 120,600 |
| NOTCHED IZOD IMPACT @ −30° C. - NATURAL COLOR | | | | | | | |
| | Gate End | 2.74 | 1.22 | 2.38 | 2.38 | 2.69 | 2.45 |
| | Far End | 3.16 | 2.03 | 3.31 | 3.03 | 3.23 | 2.20 |
| NOTCHED IZOD IMPACT @ ROOM TEMP. - NATURAL COLOR | | | | | | | |
| | Gate End | 27.5 | 27.0 | 28.2 | 25.9 | 26.8 | 30.4 |
| | Far End | 29.4 | 26.3 | 28.7 | 27.7 | 28.8 | 28.0 |
| CAPILLARY RHEOLOGY @ 240° C. (Shear Viscosity, Pa*Sec) vs. (Shear Rate, Sec.$^{-1}$) | | | | | | | |
| | 24.3 | 2,018.3 | 1,466.6 | 1,403.6 | 1,413.3 | 1,495.6 | 1,442.4 |
| | 206.7 | 775.6 | 546.6 | 533.6 | 546.1 | 602.5 | 564.3 |
| | 401.3 | 550.9 | 400.7 | 393.4 | 403.3 | 433.6 | 414.2 |
| | 595.9 | 445.5 | 333.7 | 324.6 | 329.9 | 351.3 | 343.0 |
| | 997.2 | 334.2 | 259.8 | 242.1 | 247.6 | 268.1 | 269.4 |
| | 997.2 | 338.1 | 231.0 | 255.1 | 266.4 | 292.5 | 261.6 |
| | 1471.5 | 271.3 | 187.7 | 206.0 | 212.6 | 232.3 | 212.6 |

EXAMPLE 4

In a manner analogous to the previous examples, an additional set of six runs involving metallic pigmented blends of the polyamide (Ultramid® B3) and ionomer (Surlyn® 9120) were prepared by the split feed procedure using a 30 mm extruder operated at 100 rpm and flow rate greater than 25 lbs./hr and tested. The respective blends, runs 1 through 3, were prepared at three progressively higher concentrations of silver pigment loading in order to illustrate the degradation of impact strength when metallic flake is present in such blends. Runs 4 through 6 involve the respective blends modified by the addition of a MAN-g-EPDM; ethylene/propylene/hexadiene terpolymer grafted with 2.1% maleic anhydride (TRX-301). The resulting data are presented in TABLE 4. This data illustrates the progressive lowering of the Izod Impact strength at 24° C. and 0° C. with increasing metallic flake pigmentation. Runs 3 through 6 illustrate that this loss in impact properties is essentially restored to values more characteristic of the non-pigmented ionomer/polyamide blend by the addition of 5 weight percent MAN-g-EPDM rubber.

Having thus described and exemplified the invention with a certain degree of particularity, it should be appreciated that the following claims are not to be so limited but are to be afforded a scope commensurate with the wording of each element of the claim and equivalents thereof.

TABLE 4

| | RUN | 1 | 2 | 3 | 4 | 5 | 6 |
|---|---|---|---|---|---|---|---|
| | Comments | SG201UG Control with Silvet @ 1 phr | SG201UG Control with Silvet @2.5 phr | SG201UG Control with Silvet @5 phr | 140-1 with 5% TRX-301 | 140-2 with 5% TRX-301 | 140-3 with 5% TRX-301 |
| Added Up-Stream | Surlyn ® 9120 | 41.39% | 40.78% | 39.81% | 29.31% | 38.68% | 37.69% |
| | ZnO Conc. (CS8749-5) | 2.23% | 2.20% | 2.14% | 2.12% | 2.09% | 20.40% |
| Added Down-Stream | ULTRAMID ® B3 | 51.78% | 51.02% | 49.80% | 49.15% | 48.41% | 47.20% |
| | TRX-301 | 0 | 0 | 0 | 5.00% | 5.00% | 5.00% |
| | Zn Stearate | 1.49% | 1.46% | 1.43% | 1.41% | 1.39% | 1.36% |
| | Sodium Hypophosphite | 0.17% | 0.17% | 0.17% | 0.16% | 0.16% | 0.16% |
| | Silvet 790-20-E | 0.99% | 2.44% | 4.76% | 0.99% | 2.44% | 4.76% |

TABLE 4-continued

| RUN | 1 | 2 | 3 | 4 | 5 | 6 |
|---|---|---|---|---|---|---|
| TENSILE PROPERTIES @150° C. | | | | | | |
| Tensile @ Yield (psi) | 760 | 870 | 870 | 830 | 840 | 830 |
| Elong @ Yield, % | 11% | 12% | 13% | 12% | 12% | 12% |
| Tensile @ Break (psi) | 1,860 | 2,250 | 2,030 | 1,860 | 1,900 | 2,010 |
| Elong @ Break, % | 318% | 320% | 312% | 308% | 318% | 317% |
| Max Tensile (psi) | 2,160 | 2,290 | 2,200 | 2,030 | 2,060 | 2,080 |
| Elong @ Max Tens, % | 310% | 315% | 306% | 300% | 302% | 309% |
| NOTCHED IZOD IMPACT @ROOM TEMPERATURE (24° C.) - SILVET METALLIC | | | | | | |
| Gate End | 23.3 | 19.9 | 17.5 | 23.4 | 23.2 | 20.2 |
| Far End | 25.1 | 23.3 | 20.8 | 23.6 | 22.8 | 21.9 |
| NOTCHED IZOD IMPACT @0° C. - SILVET METALLIC | | | | | | |
| Gate End | 9.67 | 6.83 | 5.18 | 18.0 | 10.9 | 8.35 |
| Far End | 12.5 | 8.10 | 5.73 | 18.4 | 12.1 | 8.71 |
| NOTCHED IZOD IMPACT @-30° C. - SILVET METALLIC | | | | | | |
| Gate End | 3.59 | 2.86 | 3.00 | 3.11 | 2.76 | 2.73 |
| Far End | 4.10 | 3.29 | 3.04 | 3.39 | 3.42 | 2.71 |

| CAPILLARY RHEOLOGY @240° C. (Shear Viscosity, Pa*Sec) - BLACK | | | | | | |
|---|---|---|---|---|---|---|
| DATE | Sep. 19, 2001 | Sep. 19, 2001 | Sep. 19, 2001 | Sep. 19, 2001 | Sep. 19, 2001 | Sep. 19, 2001 |
| 24.3 | 2,032.7 | 2,089.7 | 2,002.7 | 2,040.8 | 2,318.3 | 2,253.0 |
| 206.7 | 777.1 | 836.8 | 818.2 | 914.3 | 929.0 | 962.9 |
| 401.3 | 555.1 | 605.2 | 593.0 | 657.7 | 660.6 | 684.7 |
| 595.9 | 448.8 | 492.7 | 486.5 | 518.0 | 530.9 | 537.3 |
| 997.2 | 339.0 | 371.5 | 366.5 | 381.2 | 398.9 | 393.6 |
| 997.2 | 332.3 | 372.2 | 369.4 | 401.8 | 404.3 | 419.0 |
| 1,471.5 | 265.2 | 294.9 | 295.5 | 313.2 | 317.1 | 323.8 |

I claim:

1. An ionomer/polyamide alloy blend having improved flow properties comprising;
   an ionomer/polyamide alloy consisting of from 40 to 60 parts by weight ionomer phase and from 60 to 40 parts by weight continuous or co-continuous semicrystalline polyamide phase and for every one hundred parts by weight of ionomer/polyamide alloy blend:
   (i) from one to twenty parts by weight low molecular weight copolymer of ethylene and at least one other comonomer selected from the group consisting of acrylic acid, methacrylic acid and mixtures thereof, wherein said low molecular weight copolymer has a melt index (ASTM D1238) of greater than 350 dg/min and an acrylic acid and methacrylic acid combined comonomer content of at least 5 weight percent; and optionally
   (ii) up to twenty parts per weight of one or more additives selected from the group consisting of very low density polyethylene (VLDPE), maleic anhydride grafted VLDPE, ethylene propylene (EPR) rubber, maleic anhydride grafted EPR, ethylene propylene diene monomer (EPDM) rubber, maleic anhydride grafted EPDM and mixtures thereof.

2. An ionomer/polyamide alloy blend of claim 1 wherein said low molecular weight copolymer of ethylene and at least one other comonomer has a melt index of at least 900 dg/min.

3. An ionomer/polyamide alloy blend of claim 1 wherein said very molecular weight copolymer of ethylene and at least one other comonomer has an acrylic acid and methacrylic acid combined comonomer content of at least 9 weight percent.

4. A method of reducing the viscosity of an ionomer/polyamide alloy blend without significantly degrading low temperature impact resistance comprising the steps of blending for every one hundred parts by weight of ionomer/polyamide alloy blend
   (i) from one to twenty parts by weight low molecular weight copolymer of ethylene and at least one other comonomer selected from the group consisting of acrylic acid, methacrylic acid and mixtures thereof, wherein said low molecular weight copolymer has a melt index (ASTM D1238) of greater than 350 dg/min and an acrylic acid and methacrylic acid combined comonomer content of at least 5 weight percent; and optionally
   (ii) up to twenty parts per weight of one or more additives selected from the group consisting of very low density polyethylene (VLDPE), maleic anhydride grafted VLDPE, ethylene propylene (EPR) rubber, maleic anhydride grafted EPR, ethylene propylene diene monomer rubber (EPDM), maleic anhydride grafted EPDM, and mixtures thereof to produce a blend of claim 1.

5. A method of claim 4 wherein said low molecular weight copolymer of ethylene and at least one other comonomer has a melt index of at least 900 dg/min.

6. A method of claim 4 wherein said low molecular weight copolymer of ethylene and at least one other comonomer has an acrylic acid and methacrylic acid combined comonomer content of at least 9 weight percent.

7. A metallic pigmented ionomer/polyamide alloy blend having improved impact properties comprising for every one hundred parts by weight of ionomer/polyamide alloy blend: from 2.5 to twenty parts per weight of one or more additives selected from the group consisting of very low density polyethylene (VLDPE), maleic anhydride grafted VLDPE, ethylene propylene (EPR) rubber, maleic anhydride grafted EPR, ethylene propylene diene monomer (EPDM) rubber, maleic anhydride grafted EPDM and mixtures thereof.

8. A metallic pigmented ionomer/polyamide alloy blend of claim 7 wherein said additive is a maleic anhydride grafted EPDM.

9. A method of restoring impact resistance of a metallic pigmented ionomer/polyamide alloy blend comprising the step of blending for every one hundred parts by weight of a metallic pigmented ionomer/polyamide alloy blend from 2.5 to twenty parts per weight of one or more additives selected from the group consisting of very low density polyethylene (VLDPE), maleic anhydride grafted VLDPE, ethylene propylene (EPR) rubber, maleic anhydride grafted EPR, ethylene propylene diene monomer rubber (EPDM), maleic anhydride grafted EPDM, and mixtures thereof.

10. A method of claim 9 wherein said additive is a maleic anhydride grafted EPDM.

* * * * *